June 18, 1929.  W. T. FITZ GERALD ET AL  1,718,127
CIGAR MAKING MACHINE
Original Filed Oct. 14, 1924   9 Sheets-Sheet 3
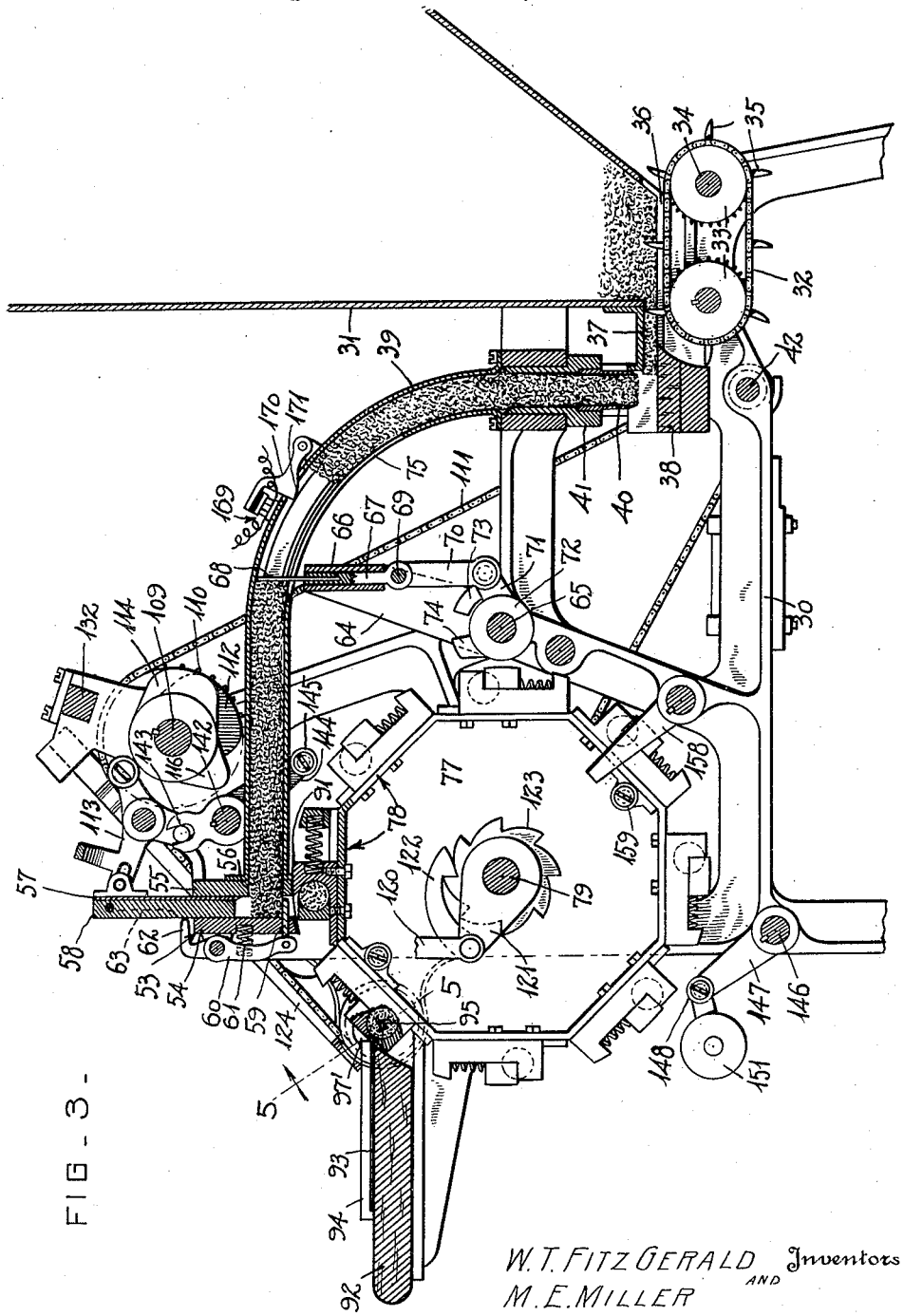
FIG-3-
W.T. FITZ GERALD
M.E. MILLER
Inventors
AND
By Monroe C. Miller
Attorney

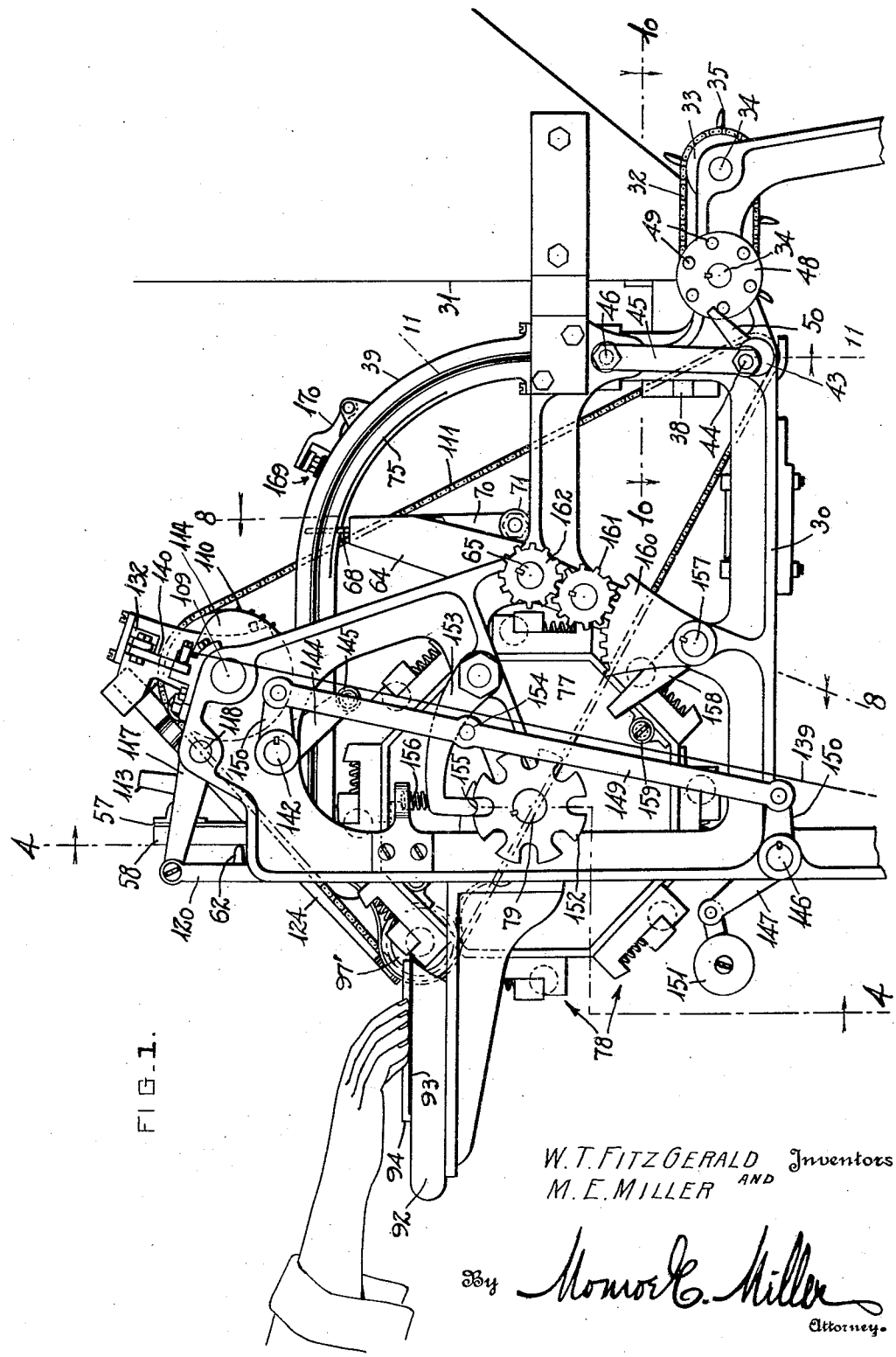

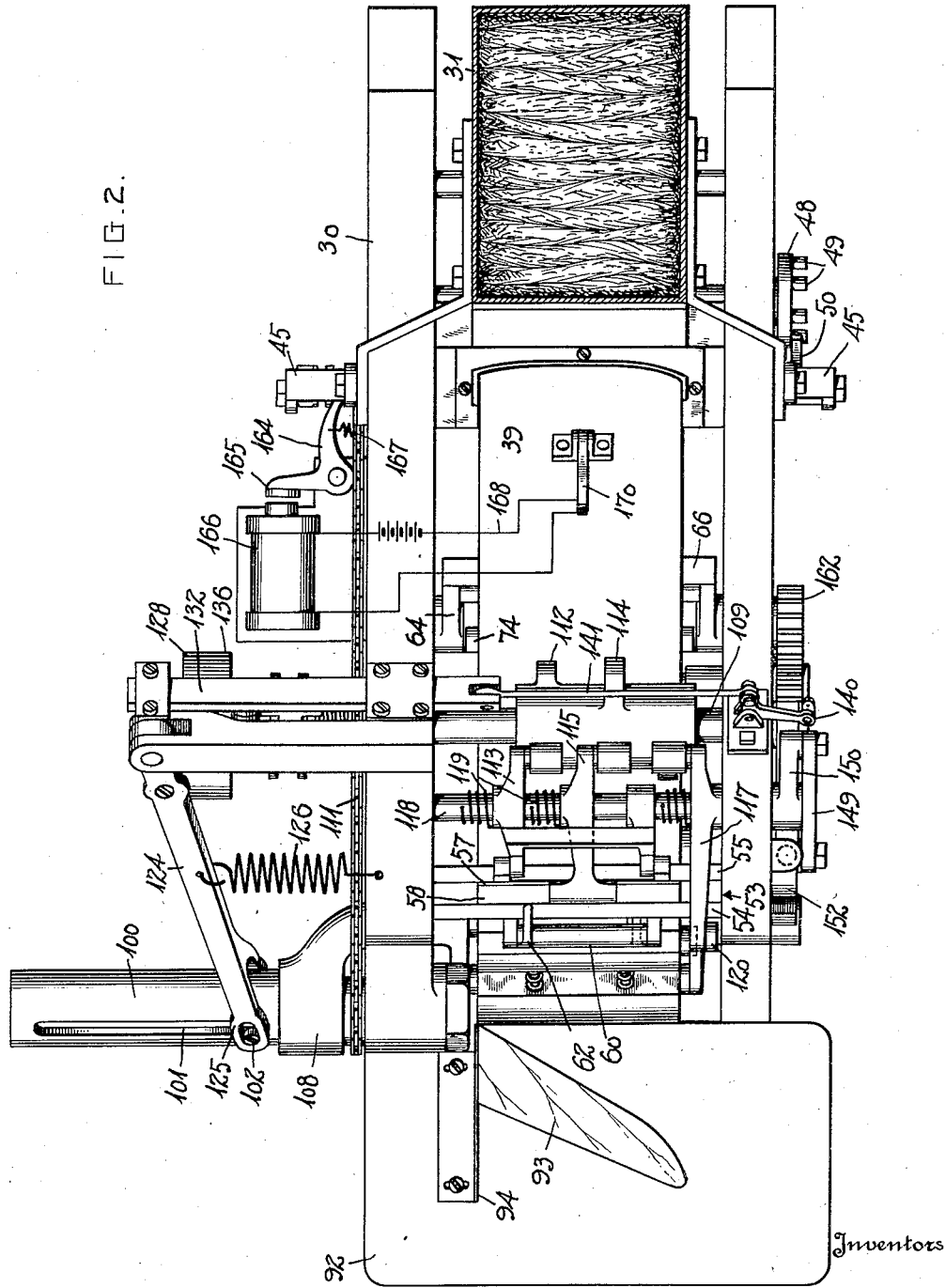

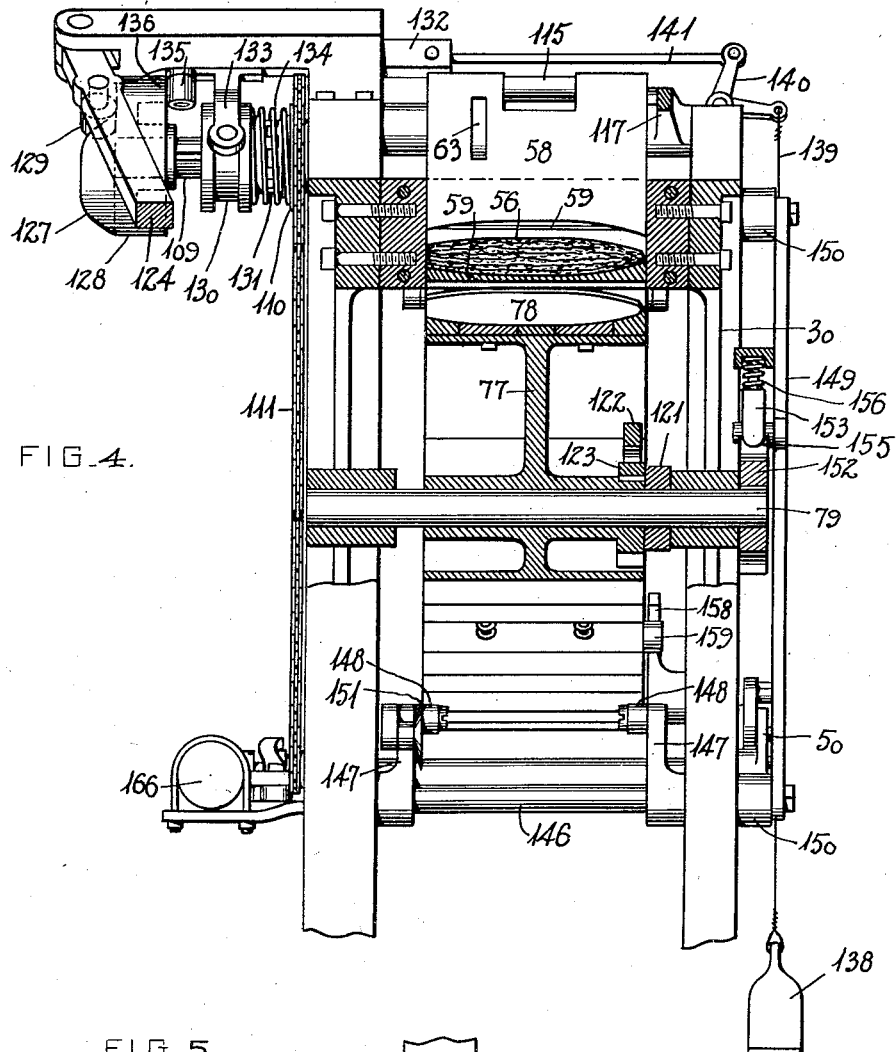
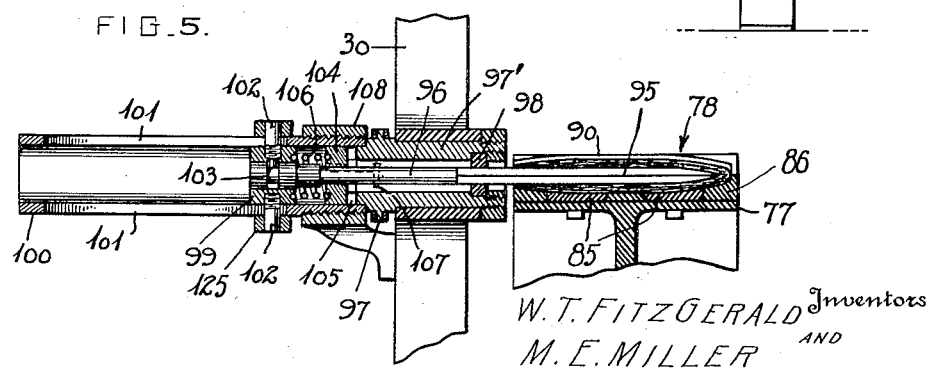

June 18, 1929. W. T. FITZ GERALD ET AL 1,718,127
CIGAR MAKING MACHINE
Original Filed Oct. 14, 1924   9 Sheets-Sheet 5
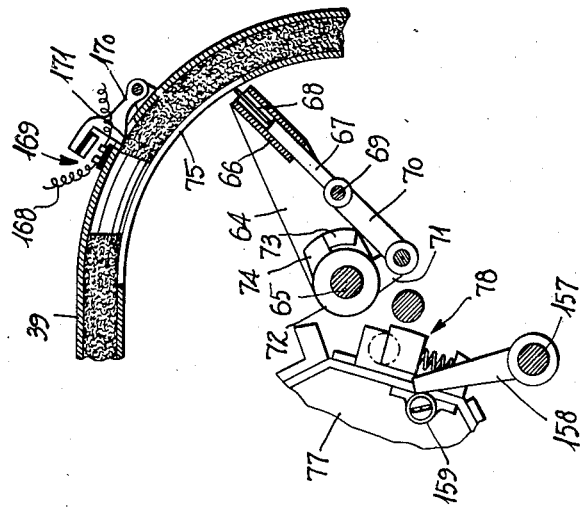
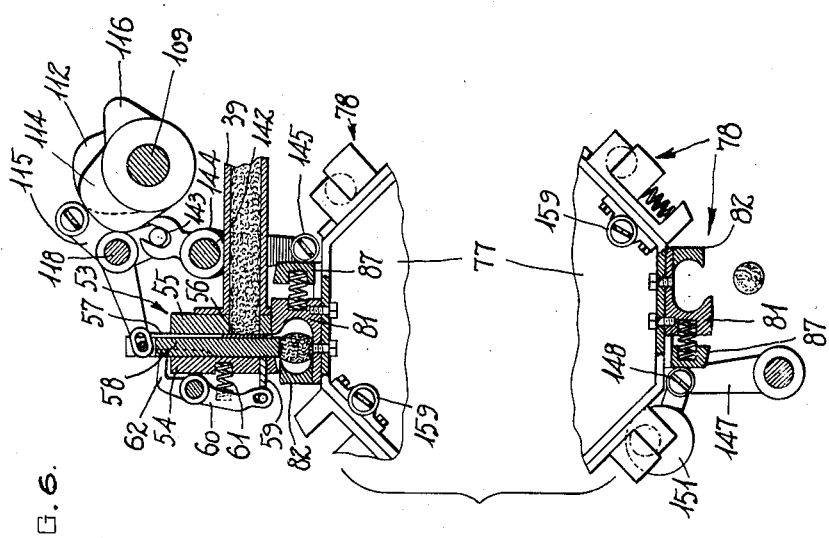
W. T. FITZ GERALD
M. E. MILLER
Inventors
By Monroe E. Miller
Attorney.

June 18, 1929.   W. T. FITZ GERALD ET AL   1,718,127
CIGAR MAKING MACHINE
Original Filed Oct. 14, 1924   9 Sheets-Sheet 6

Inventors
W. T. FITZ GERALD
AND
M. E. MILLER

By Monroe E. Miller
Attorney.

June 18, 1929. W. T. FITZ GERALD ET AL 1,718,127
CIGAR MAKING MACHINE
Original Filed Oct. 14, 1924  9 Sheets-Sheet 7

W. T. FITZGERALD
M. E. MILLER   Inventors

By Monroe E. Miller
Attorney

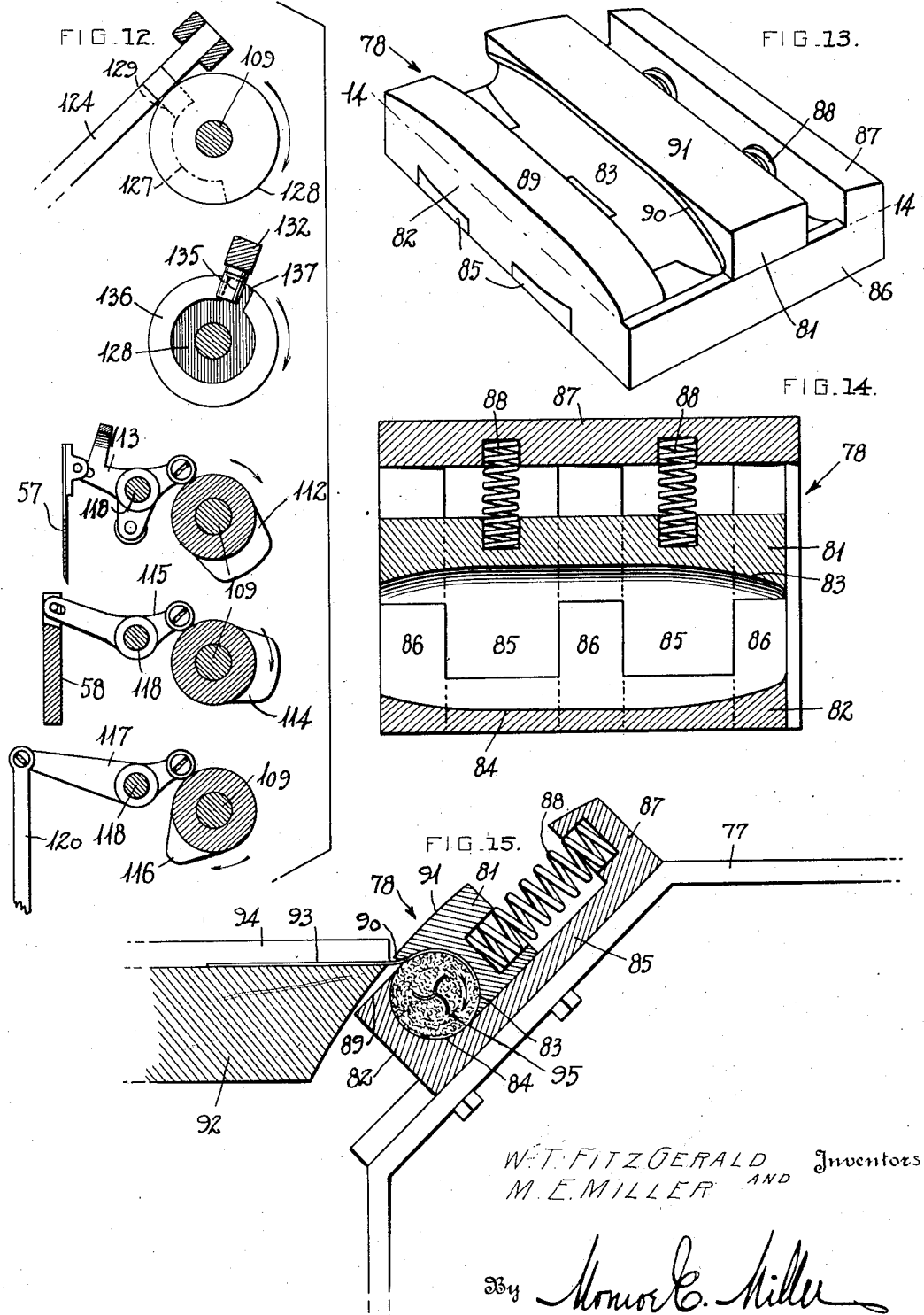

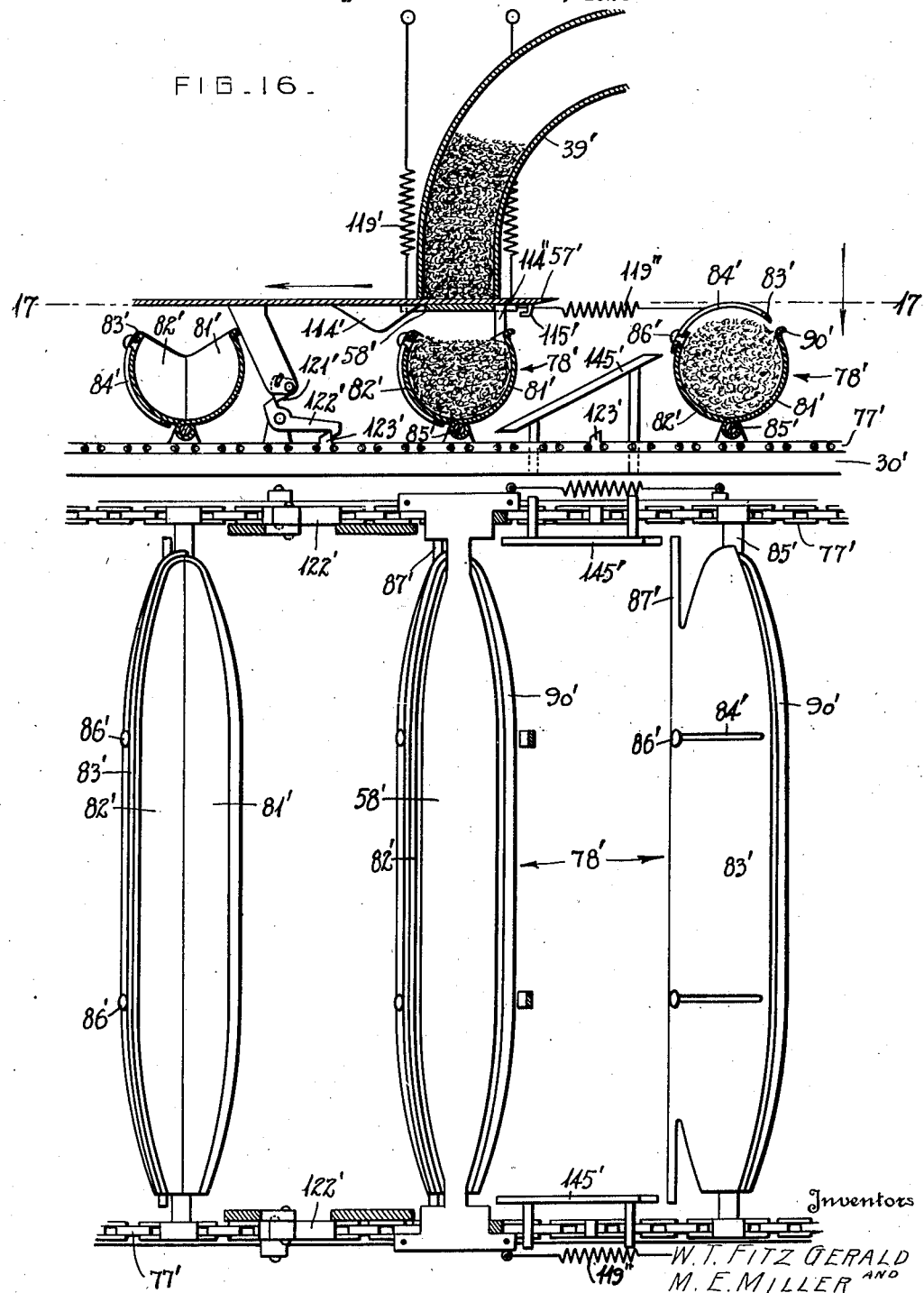

Patented June 18, 1929.

1,718,127

UNITED STATES PATENT OFFICE.

WILLIAM T. FITZ GERALD, OF COCOANUT GROVE, FLORIDA, AND MONROE E. MILLER, OF WASHINGTON, DISTRICT OF COLUMBIA, ASSIGNORS, BY DIRECT AND MESNE ASSIGNMENTS, TO INTERNATIONAL CIGAR MACHINERY COMPANY, A CORPORATION OF NEW JERSEY.

CIGAR-MAKING MACHINE.

Application filed October 14, 1924, Serial No. 743,625. Renewed March 18, 1929.

The present invention relates to cigar making machines, and has for its object the provision of a novel and improved machine, for the production of cigars economically by the elimination of the greater part of the manual labor now required in making hand-made cigars.

Another object is the provision of a cigar making machine which is comparatively simple in construction and operation, and which is improved generally in its construction and in the several devices of which the machine is composed to provide for practical and efficient operation.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the machine.

Fig. 2 is a plan view thereof showing the tobacco hopper in section.

Fig. 3 is a vertical section of the machine.

Fig. 4 is a section on the line 4—4 of Fig. 1.

Fig. 5 is a section on the line 5—5 of Fig. 3.

Fig. 6 is a fragmentary sectional detail showing the upper and lower molds opened and the bunch forming device in operation.

Fig. 7 is a sectional detail showing the tobacco feeder for the magazine in retracted position.

Fig. 12 is a view showing the relative positions of the cams of the cam shaft and parts operated thereby.

Fig. 13 is a perspective view of one of the cigar molds.

Fig. 14 is a section on the line 14—14 of Fig. 13.

Fig. 15 is a cross-section of one of the cigar molds in wrapper-receiving position, and showing the wrapper being applied.

Fig. 16 is a sectional view, somewhat diagrammatical, illustrating modifications in the molds, their carrier and their filling means.

Fig. 17 is a section on the line 17—17 of Fig. 16.

Figure 8:
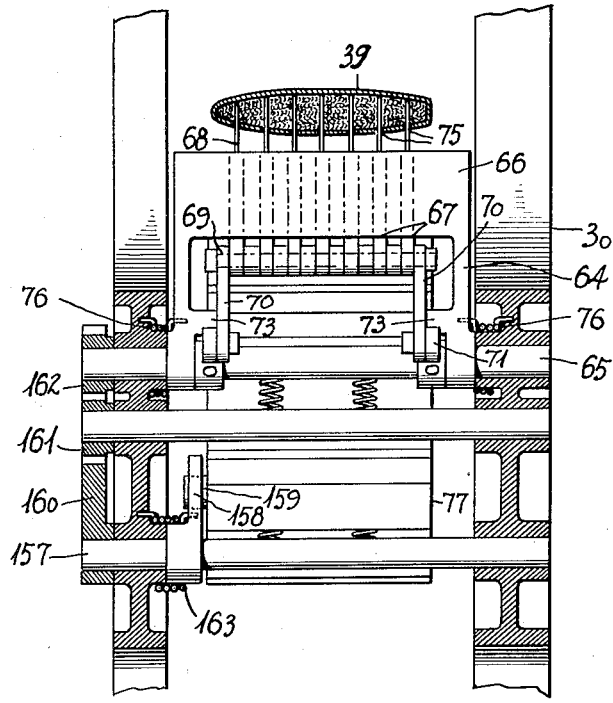
Fig. 8 is a section on the line 8—8 of Fig. 1.
Figure 9:
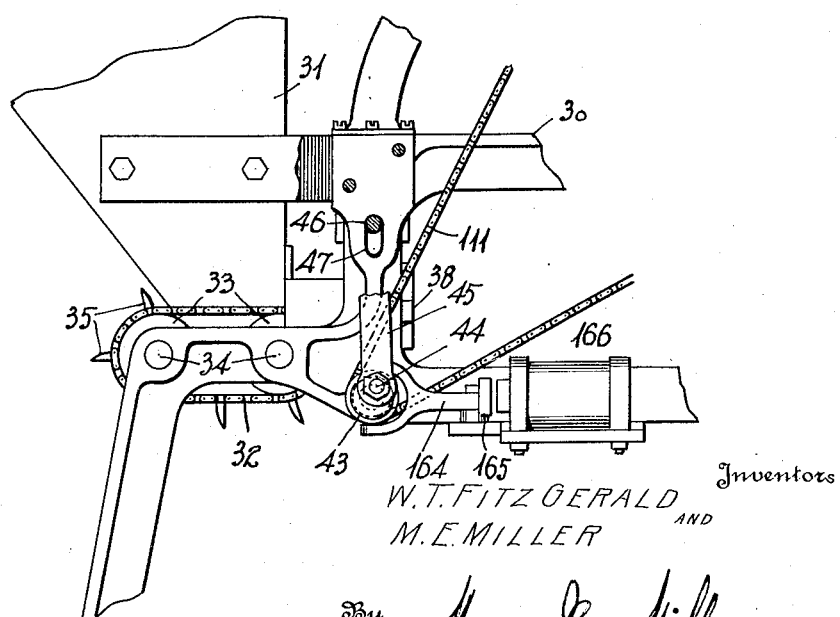
Fig. 9 is a fragmentary side elevation opposite to that shown in Fig. 1.
Figure 10:
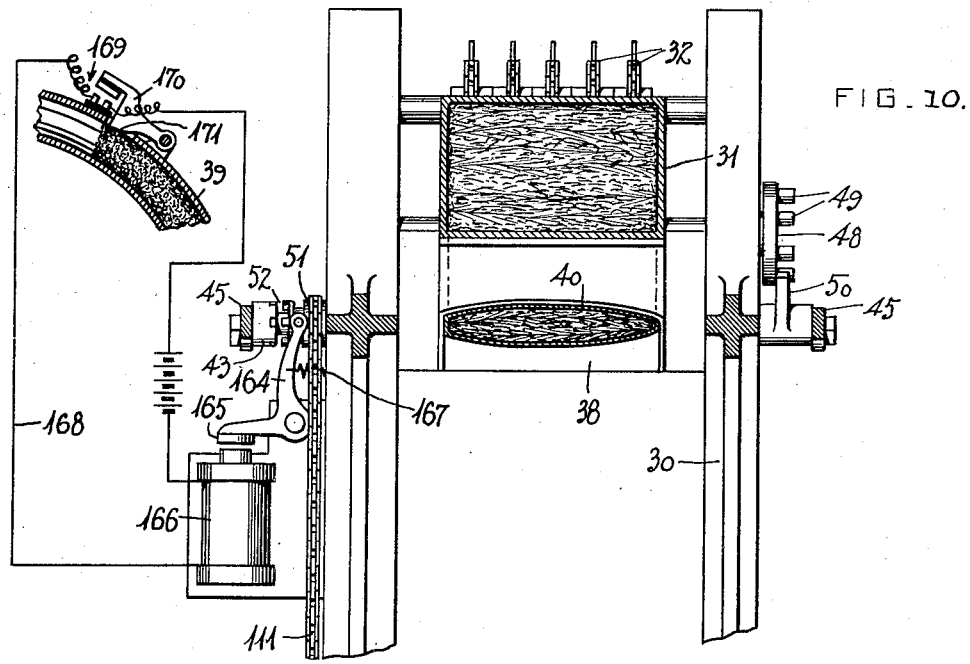
Fig. 10 is a section on the line 10—10 of Fig. 1 showing the electrical circuit in diagram.
Figure 11:
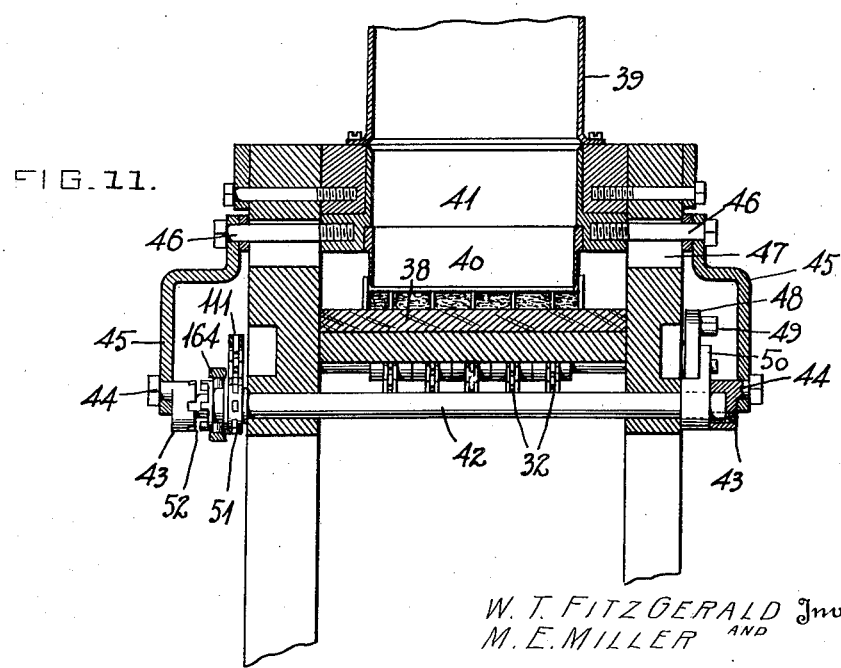
Fig. 11 is a section on the line 11—11 of Fig. 1.

A suitable frame 30 is provided, and a hopper 31 is supported by the frame at the rear thereof and contains the tobacco used for the fillers of the cigars, such filler tobacco being selected or cut to length and the hopper being of a width substantially the length of the cigars to be produced.

A feeder is provided for feeding the tobacco from the hopper 31, and comprises endless sprocket chains 32 trained around sprocket wheels 33 mounted on shafts 34 journaled in the frame 30 below the hopper, and the upper runs of the sprocket chains work closely under the bottom of the hopper. The chains 32 have outstanding fingers 35 working through slots 36 in the bottom of the hopper so as to move the tobacco forwardly through the discharge slot or opening 37 of the hopper over onto a chopping block 38.

The tobacco is chopped or cut into cigar-shape on the block 38 and fed into a magazine 39 which is of a cross-section similar to the outline of a cigar. For this purpose, a chopping knife or cutter 40 is mounted for reciprocation above the block 38, and is of a shape similar to the outline of a cigar, said cutter having its lower edge sharpened to cut the tobacco when the cutter moves down against the block 38, and the cutter is hollow so that the tobacco cut thereby is forced upwardly through the cutter and into the magazine 39. Said cutter is secured within a slide 41 mounted for reciprocation within the frame and registering with the lower end of the magazine 39, said slide being hollow for the passage of the tobacco therethrough from the cutter into the magazine. The passage of the slide 41 and magazine 39 is slightly wider than the passage through the cutter, whereby the tobacco will move freely through the magazine, with little friction, although there may be greater friction of the tobacco when moving through the cutter 40. After passing through the cutter, the tobacco can expand slightly in the magazine so as to be moved forwardly in the magazine without clogging or sticking.

The chopper or cutter and feeder are operated in synchronism to properly supply the tobacco to the magazine. The operating mechanism includes a shaft 42 journaled in the frame under the chopping block 38 and having collars or caps 43 secured on the ends thereof and provided with cranks 44 connected by links 45 with pivot bolts or pins 46 secured to the slide 41 and working in slots 47 in the side members of the frame, whereby the rotation of the shaft 42 will reciprocate the slide and depending cutter. A disk or wheel 48 is secured on one of the shafts 34 and has outstanding pins 49 for the contact of an arm 50 secured on the shaft 42. When the shaft 42 makes one revolution, the arm 50 strikes one of the pins 49 and turns the wheel 48 one step, thereby advancing the feeder chains 32 one step. The arm 50 is so arranged that the feeder is advanced while the cranks 44 are moving over center, so that the tobacco is fed onto the chopping block 38 while the cutter 40 is in raised position, and when the cutter moves downwardly and is retracted, the feeder is stationary. Thus, the feeder and cutting or chopping device operate alternately, so as not to interfere with one another.

A sprocket wheel 51 is mounted loosely on the shaft 42 for rotating said shaft, the sprocket wheel 51 and corresponding collar 43 having the clutch teeth 52 to engage one another when the sprocket wheel 51 is shifted in one direction, and the clutch connection is opened when the sprocket wheel 51 is shifted in the opposite direction. The devices for feeding the tobacco from the hopper to the chopping block and for cutting or chopping the tobacco are thus readily started and stopped by closing and opening the clutch connection between the sprocket wheel 51 and shaft 42.

The magazine 39 extends upwardly from its rear end and from above the cutter and is curved forwardly, with its forward end directed forwardly to the bunch-forming device. This device includes a vertical guide 53 composed of the front and rear plates 54 and 55 forming a part of the frame, the forward end of the magazine 39 being secured to the plate 55 which has an opening 56 registering with the magazine for the passage of the filler tobacco into the vertical passage of the guide 53. A cutter knife or blade 57 is slidable in the guide along the plate 55 for shearing off the tobacco in the guide, and a plunger 58 is also slidable in the guide between the knife 57 and plate 54 to deliver and press the bunch of tobacco, constituting the filler, into the mold, as will hereinafter more fully appear. A shutter 59 is slidable in the plate 54 and normally projects rearwardly into the guide 53 to prevent the tobacco dropping therefrom, and a lever 60 is fulcrumed to the plate 54 and is pivotally connected with the shutter 59 for projecting and retracting said shutter. A spring 61 is provided to swing the lever 60 for retracting the shutter, and the lever has an arm 62 bearing against the plunger 58 to hold the shutter 59 in projected position when the plunger is raised or retracted. The plunger 58 has a groove 63 to receive the arm 62, when the plunger is moved downwardly, thereby permitting the spring 61 to swing the lever 60 and retract the shutter 59. In this way, as soon as the plunger is started downwardly, the shutter 59 is retracted out of the path of the plunger, and when the plunger is again returned to its uppermost position, the arm 62 will ride by cam action from the groove 63, so as to project the shutter into the passage of the guide 53.

The tobacco in the magazine 39 is advanced therein to the bunch-forming device by means of a feeder. Such feeder comprises a pair of arms 64 mounted loosely on a shaft 65 journaled in the frame, and a yoke 66 connecting said arms, with rods 67 slidable in said yoke and carrying pins or fingers 68. A pivot rod 69 extends through the set of rods 67 to slide them simultaneously, and the rod 69 is connected by links 70 with arms 71 projecting from collars 72 which are secured on the shaft 65. The arms 64 can turn relatively to the shaft 65 while the collars 72 turn with said shaft, and the arms 64 have lugs 73 between the arms 71 and lugs 74 also projecting from said collars 72. The relative movement between the collars 72 or shaft 65 and the arms 64 is therefore limited by the movement of the lugs 73 between the arms 71 and lugs 74. A portion of the magazine 39 between the ends thereof is curved about the shaft 65 as a center, and the magazine has longitudinal slots 75 through which the fingers 68 project. When the shaft 65 is turned in one direction (counter clock-wise as seen in Fig. 3) the arms 71 being turned will thrust the links 70 and rods 67 away from the shaft 65 to project the fingers 68 into the magazine 39 and the lugs 73 being moved by the arms 71 will swing the feeder forwardly so as to advance the tobacco in the magazine to the guide 53. When the shaft 65 is turned in the opposite direction, the arms 71 being moved away from the lugs 73 will retract the fingers 68 from the magazine 39, and the lugs 74 contacting with the lugs 73 will swing the feeder rearwardly and downwardly. In this way, the feeder can take up the tobacco which is supplied into the magazine from the cutting or chopping device, and then feed the tobacco forwardly in the magazine to the bunch-forming device. The fingers 68 are retracted from the magazine when the feeder is oscillated backwardly, and then when the feeder moves forwardly the teeth are projected into the magazine so as to take up the tobacco in advance of the fingers and feed said tobacco forwardly. Suitable spring means are employed for moving the feeder forwardly, such as coiled torsion springs 76 between the arms 64 and the side members of the frame. The feeder is thus swung forwardly yieldingly to advance the tobacco in the magazine with the desired pressure.

A set of molds is mounted in the frame below the bunch-forming device, and a polygonal wheel or carrier 77 is provided to carry the molds 78. The hub of the wheel 77 is secured on a shaft 79 journaled in the frame, whereby when the wheel is rotated the molds move successively under the bunch-forming device in an annular circuit. The molds 78 are of similar construction, and are adapted to open and close transversely for receiving the bunches or fillers and to shape same. Each mold comprises the side members 81 and 82 having the cooperating recesses 83 and 84, respectively, in their adjacent sides. Each recess is of the shape of a cigar cut lengthwise in half, so that when the side members of the mold are disposed together, the recesses form a cavity having the shape of the cigar. The members 81 and 82 of the mold are slidably mounted to move together and apart, and the mold has an extensible bottom so that the side members can be separated, to open the mold, without opening the bottom of the mold. Thus, the member 81 has the bottom portions 85 extending under the member 82, and the member 82 has bottom portions 86 extending under the member 81, said portions 85 and 86 being alternated and being fitted together in sliding contact. The upper surfaces of the portions 85 and 86 are curved longitudinally of the mold to conform to the longitudinal curvature of the cigar, so that when the members 81 and 82 are separated, the portions 85 and 86 form the bottom of the widened cavity of the mold. A cross bar or yoke 87 connects the portions 86 at the side of the member 81 opposite to the member 82, and coiled springs 88 are confined between the bar 87 and member 81 to close the mold by spring pressure. The top 89 of the member 82 is curved longitudinally to conform to the shape of the cigar, with said surface 89 tangential relatively to the upper edge of the recess 84. The member 81 has a bevel 90 along the upper edge of the recess 83. When the mold is closed there is a slot longitudinally of the mold between the upper edges of the recesses 83 and 84 behind or under the bevel 90, for the reception of the wrapper. The outer or upper surfaces of the members 81 of the molds and lower end of the guide 53 are preferably curved about the shaft 79 as a center so that the molds will move snugly under the guide 53. The members 81 and bottom portions 85 thereof are secured on the rim of the wheel 77, with the members 81 in rear and the members 82 disposed forwardly, with respect to the direction of rotation of the wheel 77 (counter clock-wise as seen in Fig. 3).

In order to facilitate the insertion of the wrappers in the molds, a shelf or board 92 is carried by the frame at the front thereof, with its upper surface arranged substantially tangentially relatively to the cavity of the mold which is positioned at the rear edge of said shelf, and with the wrapper-receiving slot of the mold in the plane of the upper surface of said shelf, so that the wrapper 93 laying on the shelf can be readily slid rearwardly into the slot and cavity of the mold under the bevel 90. A gage 94 is preferably secured on the shelf 92 to assist in guiding one end of the wrapper 93 properly into the mold.

In order to wrap the wrapper around the bunch or filler in the mold, said bunch or filler is rotated by a rotator 95 inserted in the open end of the mold cavity. As shown, the rotator 95 comprises an elongated spear carried by a shaft or spindle 96 and having a plurality of transversely-curved radial blades. Said rotator has a sharpened or pointed end so as to readily enter the tobacco in the mold. The tobacco rotator 95 is rotated by a sprocket wheel 97 which has its hub 97' journaled for rotation in the corresponding side member of the frame. A support 98 for the rotator 95 is mounted for rotation with the hub 97' and the rotator 95 is slidable through said support 98, which preferably constitutes a disk mounted loosely within the hub 97' and having an aperture of a shape to accommodate the rotator 95. A collar 99 is engaged on the spindle 96 and is slidable in a guide tube 100 which has opposite longitudinal slots 101 receiving pins 102 which are secured to the collar 99, thereby preventing said collar from turning in the tube. One of the pins 102 engages an annular groove 103 in the spindle 96, thereby permitting said spindle to turn in the collar, although the spindle is compelled to move longitudinally with the collar. A clutch member 104 is feathered or splined on the spindle 96 to turn with the spindle and to slide thereon. The clutch member 104 and hub 97' have the clutch teeth 105 to engage one another when the rotator 95 is projected into the mold, a coiled spring 106 being confined between the collar 99 and clutch member 104 to move the clutch teeth into engagement. When the collar 99 and spindle 96 are retracted, the clutch member 104 is moved with the spindle 96 by a pin 107 carried by the spindle, so as to remove said clutch member from the hub 97' and thereby disconnect the spindle 96 from the sprocket wheel 97. Thus, when the rotator 95 is projected into the mold, it is connected with the sprocket wheel 97 of the operating mechanism, so as to turn the rotator in the mold, and when the rotator is retracted from the mold the clutch is opened immediately so as to stop the rotation of the spindle 96 and rotator 95. As shown, the inner end of the guide tube 100 is secured in a bracket 108 carried by the frame.

The operating mechanism includes a cam shaft 109 journaled in the frame, a sprocket wheel 110 mounted loosely on said shaft and an endless sprocket chain 111 trained around the sprocket wheels 51, 97 and 110, in order to rotate said sprocket wheels continuously during the operation of the machine, the power from a motor or other source being applied to either of said sprocket wheels or to the sprocket chain in any suitable manner. The shaft 109 carries a cam 112 for operating a lever 113 connected to the cutter knife 57, a cam 114 for operating a lever 115 connected with the plunger 58, and a cam 116 for operating a lever 117. Said levers 113, 115 and 117 are mounted loosely on a rod 118 secured in the frame, and the levers are moved in one direction by the cams, and are returned by suitable springs, such as coiled torsion springs 119 on the rod 118. The lever 117, when oscillated, rotates the mold wheel 77 step by step. Thus, the lever 117 is connected by a link with an arm 121 mounted for rotation on the shaft 79 and carrying a dog or pawl 122 engaging a ratchet wheel 123 secured on the hub of the mold wheel 77.

A lever 124 is fulcrumed to the frame, and has a fork 125 at its free end engaging the pins 102, for sliding the rotator 95 back and forth when said lever 124 is oscillated. The lever 124 is moved in one direction by the spring 126, and is moved in the opposite direction by a cam 127 on one side of a disk 128 secured on the shaft 109 to contact with a roller 129 carried by the lever 124.

A clutch member 130 is feathered or splined on the shaft 109 to turn therewith, and said clutch member 130 and sprocket wheel 110 have clutch teeth 131 to engage one another so as to rotate the shaft 109 with the sprocket wheel when the clutch is closed. A slide 132 is slidable in the frame and carries a fork 133 engaging in the annular groove of the clutch member 130, to slide said clutch member with the slide. The clutch is opened by a coiled spring 134 confined between the clutch member 130 and sprocket wheel 110, and, in order to hold the clutch closed for one revolution of the shaft 109, the slide 132 carries a roller 135 to bear against the edge of a flange 136 projecting from the disk 128 opposite to the cam 127. Said flange 136 has a notch 137 to receive the roller 135 when the shaft 109 has completed one revolution, the spring 134 moving the clutch member 130 and slide 132 so as to open the clutch when the roller 135 enters the notch 137. The rotation of the shaft 109 is started by any suitable means, such as by a pedal 138 adapted to move the slide 132 to close the clutch. As shown, the pedal 138 is connected by a wire or rod 139 with a bell crank lever 140 mounted on the frame and in turn connected by a link or rod 141 with the slide 132, so that the depression of the pedal will move the slide to close the clutch and withdraw the roller 135 from the notch 137, and as soon as the shaft 109 has turned the flange 136 will hold the roller 135 and prevent the clutch from being opened by the spring 134 until the shaft 109 has made one complete revolution. Then, the notch 137 moving behind the roller 135 will permit the roller to enter the notch by the action of the spring 134 in opening the clutch.

When the knife 57 is depressed to shut off the bunch of tobacco in the bunch-forming device, the mold immediately under said device is opened to receive the bunch. The bottom mold as well as the top mold of the mold wheel 77 is opened so that while the uppermost mold is receiving the bunch from the bunch-forming device, the completed cigar drops from the bottom mold. A rock shaft 142 is journaled in the frame below the rod 118, and is operatively connected, as at 143, such as by a pin and slot connection, with the lever 113, so that the shaft 142 is oscillated simultaneously with the lever 113. Arms 144 are secured to the rock shaft 142 and have rollers 145 disposed below the magazine 39 and arranged to move forwardly and contact with the bar or yoke 87 of the mold which is disposed immediately below and in registration with the guide 53, so that when the lever 113 is swung to depress the knife 57, the arms 144 are swung to slide the bar 87 and member 82 forwardly, thereby opening the mold, as seen in Fig. 6.

The bottom mold, which is inverted, is opened simultaneously with the opening of the upper mold. Thus, a rock shaft 146 is journaled in the frame below the wheel 77 and has arms 147 carrying rollers 148 to contact with the bar 87 of the bottom mold when the shaft 146 is turned to swing the arms 147 rearwardly. The rock shafts 142 and 146 are operatively connected to turn simultaneously. Thus, a bar or link 149 connects arms 150 secured on said shafts at one side of the frame.

In order to trim off any tobacco which may project from the open end of the molds, so as to trim off the open ends of the cigars, a cutter disk 151 is carried by the arm 147 at the corresponding side of the wheel 77, and when the arms 147 are swung to open the bottom mold, the disk 151 shears across the open end of the next mold so as to cut off any tobacco projecting from the open end of such mold.

The mold wheel 77 is locked against turning movement when the top and bottom molds thereof are opened. For this purpose, a notched lock wheel 152 is secured on the shaft 79, and a latch 153 is engageable in the notches of said wheel, to prevent the wheel 77 from turning. The link or bar 149 has the pin or lug 154 disposed under the latch 153 to raise said latch in the normal position of the parts, so that the wheel 77 can be rotated. The latch 153 has a rounded end 155 engaging slightly in the corresponding notch of the wheel 152 so as to prevent accidental or excessive turning movement of said wheel, the latch being depressed by a spring 156.

In order to move the feeder of the magazine rearwardly at intervals, for taking up tobacco fed into the magazine from the cutting device, a rock shaft 157 is journaled in the frame and has secured thereto an arm 158 to be swung by rollers 159 carried by the wheel 77. A gear segment 160 carried by the shaft 157 meshes with a pinion 161 which in turn meshes with a pinion 162 secured on the shaft 65, so that the shaft 65 is turned in the proper direction when the shaft 157 is turned by the swinging movement given the arm 158 when the roller 159 moves past said arm 158. The arm 158 is swung reversely, after being released by the roller 159, by means of a spring, such as a torsion coiled spring 163 between the arm 158 and frame 30.

The cutting device and corresponding feeder are started and stopped according to the supply of tobacco in the magazine so as to keep the magazine supplied with sufficient tobacco for the proper operation of the machine. As shown, a lever 164 carried by the frame is connected to the sprocket wheel 51 to shift it into and out of engagement with the corresponding collar 43, and said lever carries an armature 165 under the influence of an electro-magnet 166, so that when the magnet is energized, the lever 164 is swung to close the clutch, and when the magnet is deenergized, the clutch is opened by a suitable spring such as the spring 167 connected to the lever 164. The magnet 166 is disposed in an electrical circuit 168 with a switch 169 of any suitable kind operated by a lever 170 mounted on the magazine 39 and having a cam 171 projecting into the magazine, so that when the tobacco entering the magazine from the cutting device reaches the cam 171, the lever 170 will be swung outwardly to open the switch. Thus, whenever there is tobacco in the magazine under the lever 170, said lever is opened to deenergize the magnet 166 and open the clutch so as to stop the shaft 42 and parts operated thereby. When the magazine is empty below the lever 170, said lever swings down, thereby closing the circuit and energizing the magnet 166 to close the clutch and cause the cutting device to operate for supplying the tobacco into the magazine.

The cutting device operates with sufficient speed to keep the magazine supplied with tobacco. When the shaft 42 makes one revolution, the arm 50 by contact with one of the pins 49, will advance the corresponding feeder one step, to move the tobacco from the hopper under the cutter 40, and the cutter is then depressed against the block 38 and lifted or retracted. The tobacco entering the cutter fits frictionally therein so that when the cutter is raised, the tobacco in the cutter is also raised to lift the column of tobacco in the magazine, it being noted that as soon as the tobacco passes from the cutter, the tobacco can move upward with very little friction. The chopping block 38 is preferably of wood, fibre or other similar material which will not dull the edge of the cutter 40, and which can be replaced from time to time.

It is also possible to feed the tobacco manually under the cutter 40, or to provide other suitable means for feeding the tobacco to the cutting device.

The cutter 40 being of the general shape or outline of a cigar, will cut the tobacco in a shape to conform to the shape of the cigars.

The operation of the machine is as follows: The successive operations are controlled by the operator by depressing the pedal 138, and the depression of said pedal starts each cycle of operations, at the completion of which, the roller 135 is moved into the notch 137 to open the clutch between the shaft 109 and sprocket wheel 110, so that the shaft 109 and cams thereon are in initial or starting position, with the lever 124 swung by the spring 126 to project the rotator 95 into the mold which registers with the shelf 92 in wrapper-receiving position.

When the operator depresses the pedal 138, the slide 132 is moved to withdraw the roller 135 from the notch 137, thereby closing the clutch between the collar 130 and sprocket 110, so that the shaft 109 is turned, and as soon as the shaft turns, the flange 136 will move into engagement with the roller 135 to hold the slide 132 with the clutch closed, the pedal 138 being released. The flange 136 will keep the clutch closed, therefore, during a complete revolution of the shaft 109. When the shaft 109 makes a revolution the cams 127, 116, 112 and 114 operate the levers 124, 117, 113 and 115, respectively, in succession. The cam 127 swings the lever 124 outwardly, thereby retracting the rotator 95 from the mold which registers with the shelf 92, and as soon as said rotator is retracted slightly, the clutch member 104 is disengaged from the hub 97', so that the rotator 95 stops rotating, the clutch member 104 being moved by the pin 107 with the shaft or spindle 96 away from the hub 97'. The cam 116 then swings the lever 117 so that the link 120 swings the arm 121, and the dog 122 will turn the ratchet wheel 123 one step, thereby turning or advancing the mold wheel 77 one step. This will bring the mold which is under the guide 53 into registration with the shelf 92 in wrapper-receiving position, it being noted that the dog 153 can snap into and out of the notches in the collar 152 to prevent excessive movement of the wheel 77. The advance turning movement of the wheel 77 will also bring an empty mold under the guide 53, with the member 81 of such empty mold snugly under the plate 55. The cam 112 then swings the lever 113 to depress the knife 57 so as to cut off the tobacco which has been moved into the guide 53 over the shutter 59 and under the knife 57 and plunger 58 by the feeder which oscillates in the magazine 39. This will sever the bunch of tobacco at the delivery end of the magazine, which is to constitute the filler of the cigar, said bunch being of the general outline of a cigar. It is preferable that such bunch be wider than the diameter of the cavity of the mold or cigar in the direction that the bunch is moved into the mold, with the bunch of a thickness less than the diameter of the mold cavity or cigar in a direction at right angles to the line of movement of the bunch into the mold. When the lever 113 is swung to depress the knife 57, so that said knife shears off the tobacco, the edge of the knife moving across the opening 56 in the plate 55, the shaft 142 is turned, at the same time, so that the rollers 145 are moved forwardly against the bar 87 of the mold which is in bunch or filler-receiving position under the guide 53, thereby forcing the member 82 of the mold forwardly, and opening the mold, as seen in Fig. 6. When the shaft 142 is turned to open the upper mold, the shaft 146 is also turned, by means of a link or bar 148 and arms 150, so that the rollers 148 are moved rearwardly to open the inverted mold at the bottom, thereby letting the cigar drop from such opened inverted mold. At the same time, the cutter disk 151 is moved across the open end of the mext mold in rear, so as to trim off the open end of the cigar should any tobacco project from such end of the mold. When such action occurs, the bar 149 moving downwardly will release the dog 153, the pin 154 being moved downwardly with said bar, so that the dog is swung by the spring 156 into the corresponding notch of the wheel 152, thereby locking the shaft 79 and mold wheel 77 against turning movement. This will prevent the wheel 77 being turned by the pressure which is exerted by the rollers 145 and 148 to open the top and bottom molds. The cam 114 then swings the lever 115 to depress the plunger 58. As soon as said plunger starts downwardly, the arm or finger 62 of the lever 60 enters the groove 63 in the plunger, and the spring 61 swings said lever to retract the shutter 59. The plunger moving downwardly will force or press the bunch of tobacco, which has been cut by the knife 57, down into the open mold, as seen in Fig. 6, and the bunch of tobacco is compressed so as to bulge laterally toward the recesses 83 and 84 of the mold members. The lower end of the plunger 58 is of a curvature or form to conform to the shape of the cigar, the same as the upper surface 89 of the member 82 of the mold. The bunch is therefore delivered into the open mold and given a second shaping, the initial or primary shaping being done by the cutter 40.

The cam 116 can release the lever 117 as soon as the wheel 77 has been turned one step, so that the lever 117 and dog 122 are returned to normal position. When the plunger has been depressed, the cam 112 then releases the lever 113, so that the knife 57 is raised or retracted while the plunger is still down. When the knife 57 is retracted, the mold opening rollers 145 and 148 and corresponding parts are also returned to normal position, and the member 82 of the upper mold being released by the rollers 145, will result in such mold being closed by its springs 88. The member 82 of such mold therefore moves rearwardly under the plunger 58, thereby taking the bunch from under the plunger and compressing it in the cavity of the mold between the mold members 81 and 82. Such spring pressure of the mold has a tendency to compress the bunch or filler into circular cross-section. The lever 124 is released by the cam 127 when the mold wheel 77 has been moved one step, so that the spring 126 swings the lever 124 to project the rotator 95 into the mold which has been brought into registration with the shelf 92. Then, after the several operations described, the plunger 58 is raised after the knife 57 has been raised, the cam 114 having released the lever 113, and the notch 137 reaches the roller 135 so that said roller is moved into the notch by the spring 134, thereby opening the clutch 131 and stopping the shaft 109. When the plunger 58 is raised, the finger or arm 62 is forced by cam action out of the groove 63, thereby projecting the shutter 69 into the passage of the guide 53, so as to support the tobacco which is forced into said passage from the magazine 39 as soon as the knife and plunger are raised above the opening 56. The operations for supplying the tobacco in the magazine 39 and delivering the bunches or fillers into the molds are automatic, under the manual control of the pedal or starting member 138. The wrapping of the tobacco to complete the cigar requires only the manual feeding of the wrappers into the molds, as will presently appear.

As hereinbefore explained, after the mold wheel 77 has been turned one step to move a mold from the bunch-forming device to the shelf 22 or wrapper receiving position, the cam 127 releases the lever 124 so that the spring 126 swings said lever 124 to project the rotator 95 into the mold which is in wrapper receiving position. When said rotator has been projected into the mold, the clutch teeth 105 between the clutch member 104 and hub 97' are engaged together, thereby rotating the rotator 95 with said hub and sprocket wheel 97. The tobacco in the mold is therefore rotated, and if the bunch or filler has not been completely compressed or formed into cigar shape, the rotation of the tobacco will complete the shaping. The wrapper 93 is then inserted into the slot of the mold, and may be guided by the shelf 92 and gage 94. When the end of the wrapper enters the mold, as the wrapper passes under the bevel 90, the wrapper will be gripped between the bunch or filler and the circular wall of the mold, thereby drawing the wrapper into the mold, and, at the same time, wrapping the wrapper around the bunch or filler in the usual spiral or helical manner, starting from the open end of the mold and twisting the rear end of the wrapper (preliminary binder and wrapper) to form the tip of the cigar. Two wrappers can be inserted, one after the other, when a double wrapper for the cigar is desired. The rear end of the wrapper is moistened with the usual adhesive, so that the wrapper will adhere at the tip of the cigar. It will be noted that as soon as the mold wheel 77 has been turned, the rotator 95 is projected into the mold which is in wrapper-receiving position, to start the rotation of the tobacco in said mold while the bunch-forming device is completing its operation to deliver the bunch into the next mold, so that the wrapping operation can be started while the bunch-forming operation is proceeding. Furthermore, when the bunch-forming device has completed its cycle of operations, it will stop, and the rotator 95 can continue its operation to complete the wrapping of the cigar. When the wrapper has been applied, the operator then depresses the pedal 138, so that the operations are repeated, the rotator 95 being retracted, the mold wheel 77 turned one step forward, the rotator 95 again projected into the corresponding mold, and the bunch-forming device operated. The speed will depend upon the skill and proficiency of the operator in inserting the wrappers, inasmuch as the machine can be operated at a fairly high speed limited only by the feeding of the wrappers into the molds, and the feeding of the wrappers is the only manual labor necessary, so that with the aid of the machine a person can make many more cigars than possible with ordinary hand-made cigars. Furthermore, the person feeding the wrappers need not be a skilled cigar maker, and it is also possible to use a suitable automatic sheet feeding device to feed the wrappers into the molds.

The tobacco in the magazine 39 in advance of the fingers 68 is moved forwardly in the magazine under the pressure (preferably adjustable) of the springs 76 and 163. Thus, the springs 76 turn the arms 64 forwardly to move the fingers 68 forwardly in the magazine, and the spring 163 also exerts influence to turn the arm 158 forwardly, and, through the gear segment 160 and pinions 161 and 162, turning the shaft 65 so that the arms 71 press against the lugs 73 to assist in moving the arms 64 forwardly. This feeder is moved rearwardly at intervals to take up additional tobacco delivered into the magazine from the cutter 40. Thus, whenever a roller 159 carried by the wheel 77 passes the arm 158, said arm is swung rearwardly and then released, which takes place during the turning movement of the wheel 77 one step. When the arm 158 is swung rearwardly, the shaft 65 is turned to move the arms 71 away from the lugs 73, the springs 76 resisting the rearward movement of the arms 64. The rods 67 are therefore slid toward the shaft 65, thereby withdrawing or retracting the fingers 68 from the magazine. Then, when the lugs 74 contact with the lugs 73, the arms 64 are swung rearwardly and downwardly, and the fingers 68 having been retracted will permit the feeder to move rearwardly and downwardly to the position as shown in Fig. 7. Then, when the arm 158 is released, the spring 163 will swing said arm forwardly, thereby turning the shaft 65 to move the arms 71 toward the lugs 73. The links 70 and rods 67 will therefore be moved away from the shaft 65, to project the fingers 68 into the magazine, and the arms 64 are then swung upwardly and forwardly by the springs 76 and 163, so that the tobacco above the fingers 68 will be moved upwardly and forwardly.

During the time that the tobacco is being fed forwardly in the magazine to the bunch-forming device, the cutter 40 is in operation to supply tobacco into the magazine 39, and the operation of the cutter 40 is sufficiently rapid to make up for irregularities in the feeding of the tobacco under the cutter, so that an adequate supply of tobacco into the magazine is provided for. When the tobacco in the magazine behind the fingers 68 reaches the point where the switch 170 is located, said switch is opened by the movement of the tobacco under the cam 171, thereby deenergizing the magnet 166 and stopping the operation of the cutter 40. Then, when the feeder of the magazine is moved backwardly it will take up an additional supply of tobacco, the fingers 68 being moved rearwardly and downwardly beyond the switch 170. It will be noted that the switch 170 will remain open as long as there is tobacco in the magazine under the switch, so that the cutter or chopper 40 will not be started in operation until the fingers 68 have moved forwardly past the switch 170.

Figs. 16 and 17 illustrate somewhat diagrammatically a modification in the construction of the molds and filler cutting and pressing means. Each mold 78' is composed of the side members 81' and 82' and the cover 83'. The side members 81' and 82' are hingedly connected together and to sprocket chains 77' or other carrier for the molds, the hinge joint being indicated at 85'. Such hinge joint permits the side members 81' and 82' to be swung apart so that the completed cigar can be discharged from the mold. The cover 83' is slidable transversely on the exterior of the side member 82', said cover having transverse slots 84' receiving headed studs 86' on the member 82'. When the cover 83' is retracted the mold is opened. The chains or carrier 77' move toward the right as seen in Figs. 16 and 17, in order to move the molds in succession, under the filler magazine 39', the molds being open as they pass under said magazine. The chains 77' move on the frame 30', and a reciprocatory knife or cutter 57' is movable under the discharge end of the magazine 39' for cutting off the bunches of tobacco to constitute the fillers of the cigars. A presser plate 58' is disposed under the cutter 57' and is held raised against the cutter by suitable springs 119', and said presser plate is moved forwardly with the cutter by means of springs 119'', and the cutter 57' has hooks or portions 115' to move the presser plate rearwardly with the cutter when the cutter is retracted from the magazine 39'. Said cutter also has depending cams 114' beyond the ends of the molds to move over the presser plate 58' and force it downwardly into the open mold below the magazine.

The cover 83' of each mold has extensions 87' to ride over inclines or cams 145' when the mold is moved away from the magazine, thereby sliding the cover 83' to closed position, with its edge spaced from the lip 90' of the side member 81' forming a slot for receiving the wrapper when the tobacco in the mold is rotated.

The chains 77' are moved when free to do so, said chains having stop lugs 123' to be engaged by detents 122', and the cutter 57' carries trippers 121' to trip said catches and disengage them from the lugs 123' during the rearward movement of the cutter.

In operation, assuming an open mold to be under the magazine 39', so that the tobacco from the magazine drops down into the mold, with the cutter 57' retracted, then, when the cutter is projected forwardly it moves snugly under the discharge end of the magazine, thereby cutting off a bunch of filler tobacco. The presser plate 58' is moved forwardly with the cutter by the springs 119'', until said presser plate strikes stops 114'', thereby positioning the presser plate over the mold. Then, as the cutter continues to move forwardly the cams 114' will pass over the plate, so as to depress the plate and compress the bunch of tobacco into the mold, said plate being raised by the springs 119' when the cams 114' have been moved beyond the presser plate. Then, when the cutter is retracted the cams 114 will again pass over the presser plate to again dent or press the tobacco into the mold, said presser plate being raised by the springs 119' when the cams 114' have been removed rearwardly from the presser plate. During the rearward movement of the cutter, the trippers 121' will disengage the catches 122' from the corresponding lugs 123', thereby permitting the chains 77' to move forwardly. The filled mold under the magazine is therefore moved forwardly with the other molds and the extension 87' passing over the inclines 145' will strike the cover 83' of the mold to closed position. The cutter 57' remains under the magazine until the next empty mold comes below the magazine, so that when the cutter is retracted the tobacco from the magazine can immediately pass down into the mold underneath, and the operation is repeated as before, the catches 122' engaging the next lugs 123' of the chains 77' so as to stop the molds after advancing one step. The presser plate 58' is removed from below the magazine by the hooks or portions 115' so as not to obstruct the delivery of tobacco from the magazine into the mold.

Having thus described the invention, what is claimed as new is:

1. In a cigar making machine, a hollow tobacco cutter of substantially cigar shape, and a magazine of similar shape registering with the cutter and arranged to receive the tobacco as it passes through the cutter.

2. In a cigar making machine, a reciprocatory hollow tobacco cutter of substantially cigar shape, a chopping block with which said cutter is cooperable, and a magazine of substantially cigar shaped cross section arranged to receive the tobacco from said cutter.

3. In a cigar making machine, a reciprocatory hollow tobacco cutter of substantially cigar shape, a chopping block with which said cutter is cooperable, means for feeding tobacco between said cutter and block, and a magazine of substantially cigar-shaped cross section communicating with said cutter to receive the tobacco therefrom.

4. In a cigar making machine, a cigar mold mounted for movement to bunch-receiving and wrapper-receiving positions in succession and having a longitudinal wrapper-receiving slot, means for rotating the tobacco in said mold when the mold is in wrapper-receiving position, and a shelf arranged to guide a wrapper through said slot into the mold when the mold is in wrapper-receiving position.

5. In a cigar making machine, a cigar mold mounted for movement to bunch-receiving and wrapper-receiving positions in succession and having a longitudinal wrapper-receiving slot and an open end, means movable through said open end of the mold into and out of the mold and adapted to rotate the tobacco in the mold when the mold is in wrapper-receiving position, and a shelf arranged to guide a wrapper through said slot into the mold when the mold is in wrapper-receiving position.

6. In a cigar making machine, a cigar mold movable from bunch-receiving to wrapper-receiving position in succession and adapted to be opened, a tobacco magazine, means for opening the mold when in bunch-receiving position and for delivering a bunch of tobacco from the magazine into the mold when opened, and means for rotating the tobacco in the mold when the mold is in wrapper-receiving position.

7. In a cigar making machine, a cigar mold mounted for movement from bunch-receiving to wrapper-receiving position in succession and adapted to be opened, a tobacco magazine, means for opening the mold when in bunch-receiving position, means for cutting off a bunch of tobacco delivered from the magazine and pressing the cut off bunch into the opened mold, means adapted to enter the mold when it is in wrapper-receiving position for rotating the tobacco in the mold, and means for guiding a wrapper into the mold when the mold is in wrapper-receiving position.

8. In a cigar making machine, a tobacco feeding magazine, a cigar mold mounted for movement to bunch-receiving position and adapted to be opened when in said position, a knife for cutting off a bunch of tobacco delivered from the magazine, a plunger movable for pressing the cut off bunch into the opened mold, said knife and plunger being mounted side by side with the knife arranged between the plunger and magazine, and means for opening the mold when in bunch-receiving position, operating said knife and then operating the plunger to press the cut off bunch into the mold.

9. In a cigar making machine, means for feeding tobacco, cigar molds movable to bunch-receiving and wrapper-receiving positions in succession, each mold being adapted to be opened and having a wrapper receiving slot, means for cutting off bunches of tobacco from the tobacco supplied by the firstnamed means, means for opening the molds when in bunch-receiving position, means for delivering the bunches into the opened molds when in bunch-receiving position, and means for rotating the tobacco in the molds when in wrapper-receiving position.

10. In a cigar making machine, a tobacco feeding magazine, a bunch forming device receiving tobacco from the magazine and including a knife operable for cutting off bunches of the tobacco delivered from the magazine and a plunger for discharging the bunches from said device, cigar molds mounted for movement to bunch-receiving and wrapper-receiving positions in succession and registering with said device when in bunch receiving position, said molds being adapted to be opened to receive the bunches, and having wrapper-receiving slots, means for opening the molds when in bunch-receiving position, means for operating said knife and plunger to cut off a bunch and deliver same into the opened mold in bunch-receiving position, and means for rotating the tobacco in the molds when in wrapper-receiving position.

11. In a cigar making machine, a cigar mold comprising separable side members having cooperating recesses forming a cigar-shaped cavity with a wrapper-receiving slot between said members, one member having a projecting portion along said slot for guiding a wrapper through said slot tangentially into said cavity.

12. In a cigar making machine, a mold comprising separable members having a wrapper-receiving slot between them, a plunger for pressing a bunch of tobacco into the mold when said members are separated, and having its active end shaped to conform to the shape of the cigar, one of said mold members being of similar shape to move snugly across said end of the plunger when the mold is closed, and means for rotating the tobacco in the mold.

13. In a cigar making machine, a cigar mold comprising separable side members having cooperable recesses forming a cigar-shaped cavity with a wrapper-receiving slot between said members, a plunger for pressing a bunch of tobacco into the mold when said members are separated and having its active end shaped to conform to the shape of the cigar, one of said members being of similar shape to move snugly across said end of the plunger when the mold is closed, the other member having a projecting portion along said slot for guiding a wrapper through the slot into said cavity.

14. In a cigar making machine, a tobacco feeding magazine, a bunch forming device receiving tobacco from the magazine and including a knife operable for cutting off bunches of tobacco delivered from the magazine and a plunger for discharging the bunches from said device, a cigar mold mounted for movement to bunch-receiving and wrapper-receiving positions in succession and registering with said device when in bunch-receiving position, said mold comprising separable side members having cooperable recesses forming a cigar-shaped cavity with a wrapper-receiving slot between said members, the active end of said plunger being formed to conform to the shape of the cigar, one of said members being of a similar shape to move snugly across said end of the plunger when the mold is closed with the plunger in projected position, and mechanism for separating said mold members with the mold in bunch-receiving position, for operating said knife and plunger to cut off a bunch of tobacco and deliver same into the mold with said members thereof separated, and for rotating the tobacco in the mold when the mold is in wrapper-receiving position.

15. In a cigar making machine, a filler-tobacco magazine of a cross section corresponding to the outline of a cigar, and means for cutting tobacco in such outline and feeding same into the magazine.

16. In a cigar making machine, a magazine, and a cutting device at the receiving end of the magazine adapted to cut tobacco in the shape of the cross section of the magazine and deliver it into the magazine.

17. In a cigar making machine, a reciprocatory cigar-shaped hollow cutter through which the tobacco passes as it is cut.

18. In a cigar making machine, a magazine, and a reciprocatory hollow cutter at the receiving end of the magazine through which the tobacco passes into the magazine as the tobacco is cut.

19. In a cigar making machine, a chopping block, and a reciprocatory cigar-shaped hollow cutter cooperable with said block for chopping the tobacco and through which the tobacco passes as it is chopped.

20. In a cigar making machine, a chopping block, a magazine, and a cutting device at the receiving end of the magazine cooperable with said chopping block for chopping the tobacco and feeding it into the magazine.

21. In a cigar making machine, a chopping block, a magazine, a reciprocatory hollow cutter at the receiving end of the magazine cooperable with said block for chopping the tobacco and through which the chopped tobacco passes into the magazine, and means for feeding tobacco to said chopping block.

22. In a cigar making machine, a reciprocatory cutting device formed according to the outline of a cigar for cutting tobacco in cigar shape and adapted for the passage of the cut tobacco therethrough.

23. In a cigar making machine, a reciprocatory cutting device formed according to the outline of a cigar for cutting tobacco in cigar shape and adapted for the passage of the cut tobacco therethrough, and a magazine registering with said device to receive the tobacco therefrom.

24. In a cigar making machine, a magazine of cigar-shaped cross section, and a cigar-shaped filler tobacco cutting device at the receiving end of the magazine through which the cut tobacco passes into the magazine.

25. In a cigar making machine, a magazine, means for cutting tobacco and feeding it into the magazine, and feeding means for delivering the tobacco from the magazine including a spring actuated member movable in the magazine to advance the tobacco therein and mechanism for retracting said member and returning it to pick up additional tobacco fed into the magazine by the firstnamed means.

26. In a cigar making machine, a magazine, means for cutting tobacco and feeding it into the magazine, feeding means for delivering the tobacco from the magazine including a spring actuated member movable in the magazine to advance the tobacco therein and mechanism for retracting said member and returning it to pick up additional tobacco fed into the magazine, and means for stopping the operation of the firstnamed means controlled by the tobacco in the magazine.

27. A cigar making machine including a cigar mold, means for introducing a predetermined quantity of filler tobacco into said mold, and additional means to rotate the contents of the mold whereby the desired covering for the filler will be drawn into the mold and around said filler.

28. In a cigar making machine, a cigar mold having a longitudinal slot to receive the desired covering, means for introducing a predetermined quantity of filler tobacco into said mold, and additional means to rotate the contents of the mold whereby the covering will be drawn into the mold through said slot and around said filler.

29. A cigar making machine comprising a cigar mold adapted to open and close and having a longitudinal slot when closed, means for introducing a predetermined quantity of filler tobacco into said mold when it is opened, and additional means to rotate the contents of the mold when the mold is closed whereby the desired covering for the filler will be drawn into the mold through said slot and around said filler.

In testimony whereof we hereunto affix our signatures.

WILLIAM T. FITZ GERALD.
MONROE E. MILLER.